United States Patent [19]

Lee

[11] Patent Number: 5,737,143
[45] Date of Patent: Apr. 7, 1998

[54] APPARATUS FOR MOVABLY MOUNTING A FULL ERASE HEAD FOR USE IN A VIDEO CASSETTE RECORDER

[75] Inventor: Chang-Ho Lee, Seoul, Rep. of Korea

[73] Assignee: Daewoo Electronics, Co., Ltd., Seoul, Rep. of Korea

[21] Appl. No.: 584,639

[22] Filed: Jan. 11, 1996

[30] Foreign Application Priority Data

May 30, 1995 [KR] Rep. of Korea ............... 1995/13829

[51] Int. Cl.$^6$ ............................................. G11B 21/02
[52] U.S. Cl. .......................... 360/75; 360/105; 360/119
[58] Field of Search ............................... 360/75, 69, 104, 360/105, 109, 118, 95

[56] References Cited

U.S. PATENT DOCUMENTS

| | | | |
|---|---|---|---|
| 3,768,814 | 10/1973 | Sato | 360/96.5 |
| 4,071,861 | 1/1978 | Hirose | 360/96 |
| 4,138,699 | 2/1979 | Ura et al. | 360/85 |
| 4,935,831 | 6/1990 | Shimbo | 360/105 |
| 5,050,012 | 9/1991 | Nishiumi et al. | 360/66 |

*Primary Examiner*—Aristotelis M. Psitos
*Assistant Examiner*—Larry T. Cullen
*Attorney, Agent, or Firm*—Pennie & Edmonds LLP

[57] ABSTRACT

An apparatus for movably mounting a full erase head for use in a video cassette recorder includes a solenoid positioned at one side of a deck in the video cassette recorder, a relay lever supported by a pivot secured to the deck in such a way that it is permitted to turn about the pivot by the solenoid, and an interlocking lever for mounting the full erase head, the interlocking lever being supported by a hinge fixed to the deck in such a way that it is allowed to swing about the hinge, depending on the movement of the relay lever, whereby the full erase head is allowed to come into contact with the tape even if the video cassette recorder may be in a fast forward/rewind mode.

11 Claims, 2 Drawing Sheets

APPARATUS FOR MOVABLY MOUNTING A FULL ERASE HEAD FOR USE IN A VIDEO CASSETTE RECORDER

FIELD OF THE INVENTION

The present invention relates to a video cassette recorder ("VCR"); and, more particularly, to an erasing device for use in the VCR capable of providing a fast erasing operation and reducing rainbow noises.

BACKGROUND OF THE INVENTION

Conventionally, a tape transport system in a VCR is designed to draw a portion of a magnetic tape out of a cassette loaded therein and to run same in a predetermined path by moving a pair of loading poles, which are respectively provided on a supply reel side and a take-up reel side, approximately a same distance along both sides of a head drum. While running along the predetermined path, the tape makes contact with a peripheral surface of the head drum provided with at least one or more heads so as to record/reproduce audio and video signals onto/from the tape.

In such a tape transport system, the tape path depends on an operating mode of the VCR.

In FIG. 1, there is shown a plan view illustrating the tape path in a conventional tape transport system when the VCR is in a play/record mode, wherein the conventional tape transport system includes a supply reel 1, a tension arm 2, a full erase head 3, a supply guide roller 4, a head drum 5, a take-up guide roller 6, a capstan 7, a pinch roller 8 and a take-up reel 9. The letter "T" designates a magnetic tape running therein.

The magnetic tape T extracted from the supply reel 1 first comes into contact with the full erase head 3 via the tension arm 2. The full erase head 3 performs an erasing operation only during the record mode by applying a high frequency current thereto. Further, the magnetic tape T comes into contact with the head drum 5 provided with a head (not shown) recording or reproducing information thereonto or therefrom via the supply guide roller 4. After passing the take-up guide roller 6, the magnetic tape T reaches an audio/control head (not shown). Next, the capstan 7 driven by a capstan motor(not shown), in conjunction with the pinch roller 8, exerts a steady rotational frictional force on the magnetic tape T interposed therebetween. Finally, the magnetic tape T is wound around the take-up reel 9.

When the operating mode of the VCR is changed from the play/record to a fast forward/rewind mode, the tension arm 2 is rotated clockwise in the direction indicated by an arrow in FIG. 2. Accordingly, the magnetic tape T runs without making any contact with the full erase head 3.

In such a tape transport system, since the erasing operation has to be performed only during the record mode, it takes too long. Further, since the aforementioned full erase head is stationarily positioned in front of the head drum and is used to erase a previously recorded signal prior to recording a new signal on the erased portion of the magnetic tape, a non-erased portion may exist in the magnetic tape between the head provided on the head drum and the full erase head, producing "rainbow noises".

SUMMARY OF THE INVENTION

It is, therefore, a primary object of the invention to provide a VCR including an erasing device capable of providing a fast erasing operation and reducing rainbow noises.

In accordance with one aspect of the present invention, there is provided a VCR having a full erase head for erasing information on a tape running on a deck therein, comprising: an erasing device including a driving means positioned at one side of the deck; a relay lever supported by a pivot secured to the deck in such a way that it is permitted to turn about the pivot by the driving means; and an interlocking lever provided with the full erase head and supported by a hinge fixed to the deck in such a way that it is allowed to swing about the hinge, depending on the movement of the relay lever.

BRIEF DESCRIPTION OF THE DRAWINGS

The above and other objects and features of the present invention will become apparent from the following description of preferred embodiments, when taken in conjunction with the accompanying drawings, in which.

DETAILED DESCRIPTION OF THE PREFERRED EMBODIMENTS

Figure 1:
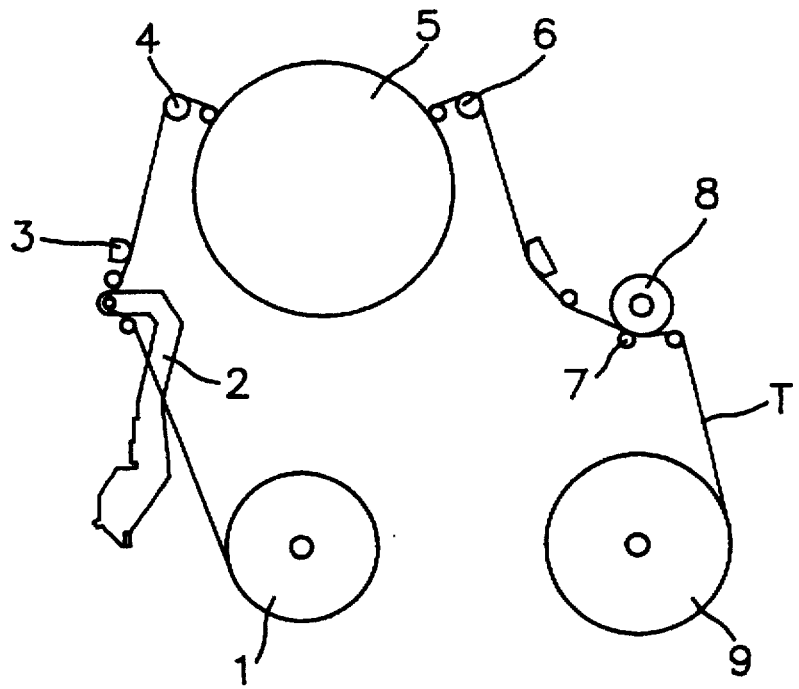
FIG. 1 shows a plan view illustrating the tape path in a conventional tape transport system when the VCR is in a play/record mode.
Figure 2:
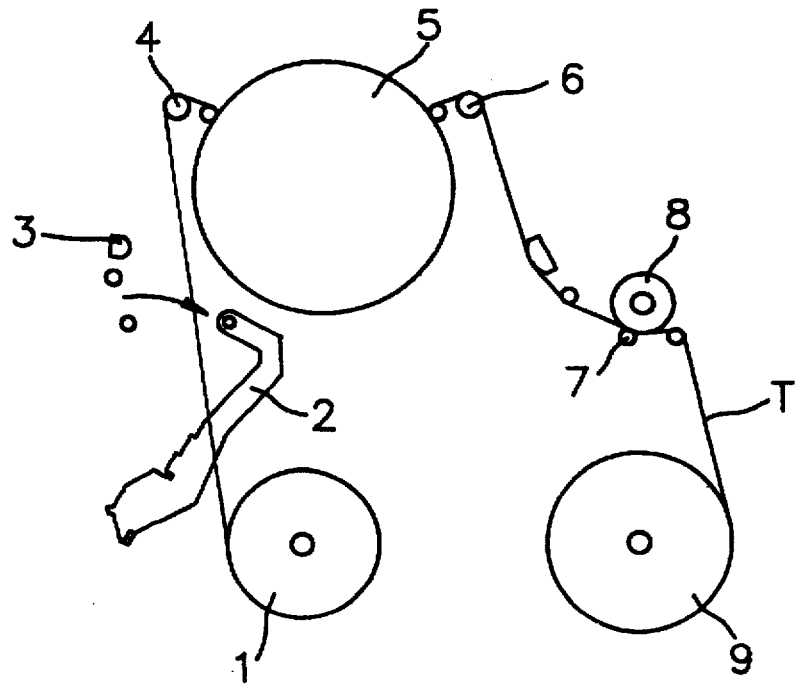
FIG. 2 represents a plan view depicting the tape path in the conventional tape transport system when the VCR is in a fast forward/rewind mode.
Figure 3:
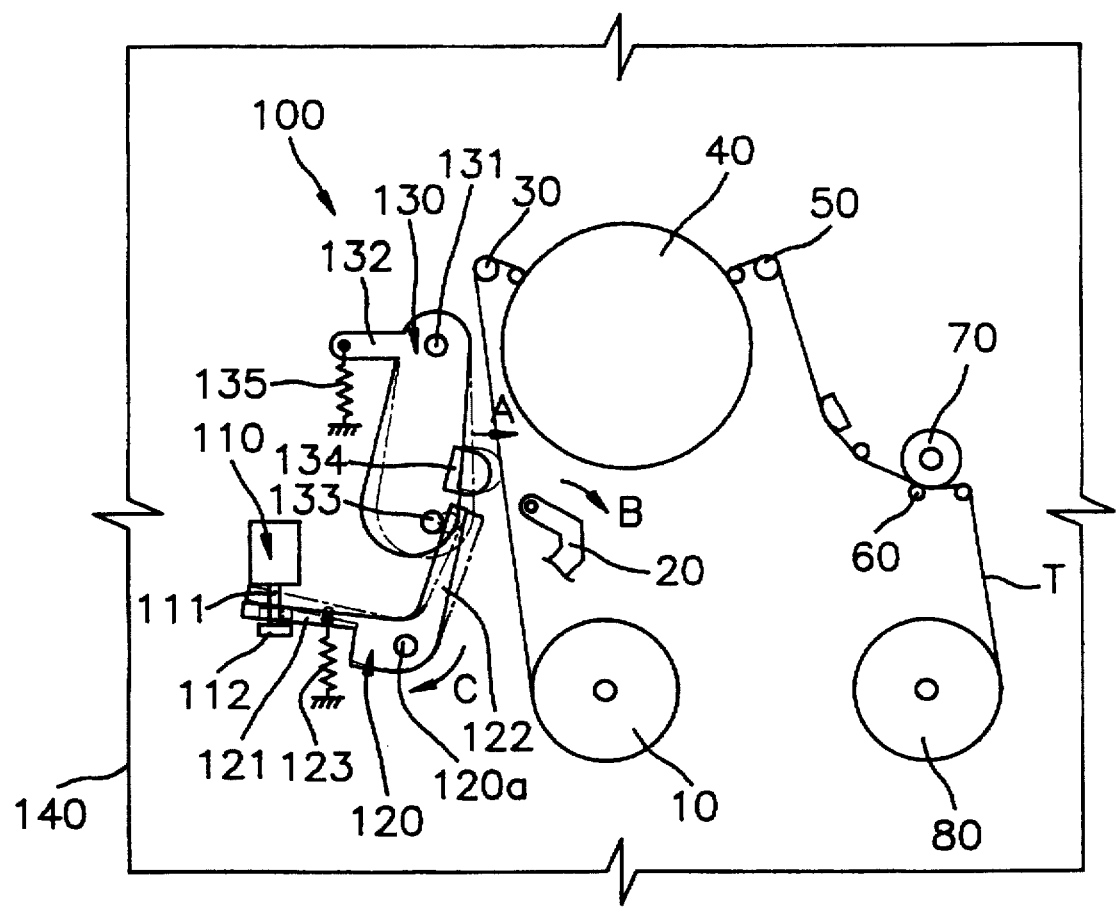
FIG. 3 offers a plan view defining the tape path in the VCR incorporating therein the inventive erasing device.

Referring to FIG. 3, there is shown a plan view illustrating a tape transport system and a tape path in a VCR incorporating therein an inventive erasing device 100.

The inventive erasing device 100 includes a solenoid 110 as driving means, a relay lever 120 and an interlocking lever 130.

The solenoid 110 positioned at one side of a deck 140 is provided with an armature 111 being partially wrapped with a coil (not shown), wherein the armature 111 is pulled to a central position with respect to the coil when the coil is energized by a current flowing therethrough, and the armature 111 also includes a stopper 112 at its one end.

The relay lever 120 with a connecting portion 121 and a pressing portion 122 is capable of turning about a pivot 120a secured to the deck 140. The connecting portion 121 is provided with an elongated hole (not shown) for fitting the armature 111, and a first resilient member 123, for example, a spring, wherein one end of the first resilient member 123 is fixed to the connecting portion 121 and the other end is fixed to the deck 140. Thus, the relay lever 120 is permitted to elastically turn about the pivot 120a, depending on the movement of the armature 111 of the solenoid 110.

The interlocking lever 130 capable of turning about a hinge 131 fixed to the deck 140 is, on its one end part, provided with a piece 132, and on its the other end part, a pin 133 and a full erase head 134. The piece 132 is provided with a second resilient member 135, for example, a spring, wherein one end of the second resilient member 135 is fixed to the piece 132 and the other end thereof is fixed to the deck 140 in such a way that the interlocking lever 130 is allowed to elastically move in a direction indicated by an arrow A when a pressing force of the pressing portion 122 of the relay lever 120 excited to the pin 133 of the interlocking lever 130 is released.

The tape transport system, on the other hand, includes a supply reel 10, a tension arm 20, a supply guide roller 30, a head drum 40, a take-up guide roller 50, a capstan 60, a pinch roller 70 and a take-up reel 80.

During a play/record mode, the tape T extracted from the supply reel 10 first comes into contact with the full erase head 134 via the tension arm 20. Further, the tape T comes into contact with the head drum 40 provided with a head (not shown) for recording or reproducing information thereonto or therefrom. Thereafter, the tape T reaches an audio/control head (not shown). Next, the capstan 60 driven by a capstan motor(not shown) exerts a steady rotational frictional force, in conjunction with the pinch roller 70, on the tape T interposed therebetween. Finally, the tape T is wound around the take-up reel 80.

When the play/record mode is changed to a fast forward/rewind mode, the tension arm 20 is rotated clockwise in the direction indicated by an arrow B, making the tape T travel without being in contact with the full erase head 134.

If there is a need for a fast erasing operation, an electric current is applied to the solenoid 110, resulting in the armature 111 being pulled toward the central position with respect to the coil in the solenoid 110, which will, in turn, force the relay lever 120 to rotate clockwise in the direction indicated by an arrow C. Due to a gyrating movement of the relay lever 120, the pressing force of the pressing portion 122 of the relay lever 120 toward the pin 33 of the interlocking lever 130 is released, thereby permitting the interlocking lever 130 to turn about the hinge 131 in a direction indicated by the arrow A. Accordingly, the full erase head 134 mounted on the interlocking lever 130 comes into contact with the tape T as shown by a chain of long and short dash lines in FIG. 3 to perform the fast erasing operation.

Under this situation, rotation of the capstan motor is transmitted into an idler (not shown) which rotates counterclockwise or clockwise depending on whether the VCR is in the fast forward or the rewind mode, winding the tape T around the take-up reel 80 or the supply reel 10.

Further, in such a tape transport system, since the erase operation may be performed in a fast forward or the rewind modes, no rainbow noises will be created.

Although the invention has been shown and described with respect to the preferred embodiments, it will be understood by those skilled in the art that various changes and modifications may be made without departing from the scope of the invention as defined in the following claims.

What is claimed is:

1. A video cassette recorder having an apparatus for erasing a video tape, said apparatus comprising:

a solenoid selectively movable between a disengaged and an engaged position;

a first lever operatively connected to said solenoid, said first lever being rotatably mounted on a deck of said video cassette recorder and movable between a disengaged position and an engaged position upon actuation of said solenoid between its corresponding disengaged and engaged positions, respectively;

a second lever operatively connected to said first lever, said second lever rotatably mounted on said deck and moveable between a disengaged position and an engaged position upon actuation of said first lever between its corresponding disengaged and engaged positions, respectively;

a full erase head fixedly mounted on a portion of said second lever and movable between a disengaged position in which the full erase head is spaced apart from said tape, and an engaged position in which the full erase head comes into contact with said video tape;

wherein
   said solenoid is moved from its disengaged position to its engaged position when said video cassette recorder is placed in a fast forward/rewind mode, thereby causing said full erase head to come into contact with said tape, and wherein said video cassette recorder further comprises a head drum having a recording/reproducing head arranged to come into contact with said tape, said recording/reproducing head and said full erase head being brought into contact with said tape independent of one another.

2. The video cassette recorder of claim 1, wherein said solenoid has an armature provided with a stopper at one end thereof.

3. The video cassette recorder of claim 2, wherein said first lever has a connecting and a pressing portion, the connecting portion being provided with an elongated hole for fitting said armature therein.

4. The video cassette recorder of claim 3, wherein said second lever is, on its one end part, provided with a piece, and on its other end part a pin, the pin being pressed or released by the pressing portion of said first lever in such a way that a gyrating movement of said first lever, when said first lever is turned by said armature, is transmitted to said second lever.

5. The video cassette recorder of claim 4, wherein said interlocking lever is further provided with a resilient member for imparting an elastic force thereto.

6. The video cassette recorder of claim 5, wherein said resilient member is a spring having a first end and a second end, said first end being connected to the piece of said second lever and said second end being connected to said deck.

7. The video cassette recorder of claim 3, wherein said first lever is further provided with a resilient member for imparting an elastic force thereto.

8. The video cassette recorder of claim 7, wherein said resilient member is a spring having a first end and a second end, said first end being connected to said connecting portion of said first lever and said second end being connected to said deck.

9. An apparatus for erasing a video tape in a video cassette recorder, said apparatus comprising:

a solenoid selectively movable between a disengaged and an engaged position, and having an armature with a stopper at one end thereof;

a first lever operatively connected to said solenoid, said first lever being rotatably mounted on a deck of said video cassette recorder and movable between a disengaged position and an engaged position upon actuation of said solenoid between its corresponding disengaged and engaged positions, respectively;

a second lever operatively connected to said first; lever, lever rotatably mounted on said deck and moveable between a disengaged portion and an engaged position upon actuation of said first lever between its corresponding disengaged and engaged positions, respectively; and a full erase head fixedly mounted on a portion of said second lever and movable between a disengaged position in which the full erase head is spaced apart from said tape, and an engaged position in which the full erase head comes into contact with said video tape;

wherein
   said solenoid is moved from its disengaged position to its engaged position when said video cassette recorder is placed in a fast forward/rewind mode, thereby causing said full erase head to come into contact with said tape;

said first lever has a connecting and a pressing portion, the connecting portion being provided with an elongated hole for fitting said armature therein; and said second lever is, on its one end part, provided with a piece, and on its other end part a pin, the pin being pressed or released by the pressing portion of said first lever in such a way that a gyrating movement of said first lever, when said first lever is turned by said armature is transmitted to said second lever, such that said full erase head is moved into contact with said video tape, independent of a movement of a second head of said video cassette recorder.

10. The apparatus of claim 9, wherein said interlocking lever is further provided with a resilient member for imparting an elastic force thereto.

11. The apparatus of claim 10, wherein said resilient member is a spring having a first end and a second end, said first end being connected to the piece of said second lever and said second end being connected to said deck.

* * * * *